(12) United States Patent
Oota et al.

(10) Patent No.: US 8,257,064 B2
(45) Date of Patent: Sep. 4, 2012

(54) ELECTRIC FUEL PUMP CAPABLE OF SUPPLYING FUEL AT HIGH FLOW RATE

(75) Inventors: Yuichirou Oota, Kariya (JP); Masaya Ootake, Kariya (JP); Kiyoshi Nagata, Nagoya (JP)

(73) Assignee: Denso Corporation, Kariya (JP)

( * ) Notice: Subject to any disclaimer, the term of this patent is extended or adjusted under 35 U.S.C. 154(b) by 398 days.

(21) Appl. No.: 12/535,962

(22) Filed: Aug. 5, 2009

(65) Prior Publication Data

US 2010/0034674 A1   Feb. 11, 2010

(30) Foreign Application Priority Data

Aug. 6, 2008 (JP) ................................. 2008-202608
Feb. 10, 2009 (JP) ................................. 2009-028749

(51) Int. Cl.
*F04B 35/04* (2006.01)
(52) U.S. Cl. .................... 417/423.7; 417/366; 417/423.1
(58) Field of Classification Search .................. 417/366, 417/423.1, 423.7; 310/87, 54, 71, 216.115, 310/89, 43, 407, 408, 409, 412
See application file for complete search history.

(56) References Cited

U.S. PATENT DOCUMENTS

| | | | | |
|---|---|---|---|---|
| 2,123,933 | A * | 7/1938 | Cotterman | 310/71 |
| 4,571,159 | A * | 2/1986 | Beardmore | 417/366 |
| 6,234,768 | B1 * | 5/2001 | Harakawa et al. | 417/366 |
| 6,422,839 | B1 * | 7/2002 | Brockner et al. | 417/423.7 |
| 7,116,023 | B2 * | 10/2006 | Wang et al. | 310/71 |
| 7,382,075 | B2 * | 6/2008 | Wang et al. | 310/194 |
| 7,950,907 | B2 * | 5/2011 | Nagata et al. | 417/423.14 |
| 8,008,832 | B2 * | 8/2011 | Rhode | 310/216.058 |
| 2003/0107273 | A1 * | 6/2003 | Ikeda et al. | 310/43 |
| 2004/0197209 | A1 * | 10/2004 | Kitaura et al. | 417/366 |
| 2005/0074343 | A1 * | 4/2005 | Naito | 417/423.3 |
| 2005/0220641 | A1 * | 10/2005 | Nagata et al. | 417/423.3 |
| 2006/0066159 | A1 * | 3/2006 | Enomoto et al. | 310/54 |
| 2007/0063594 | A1 * | 3/2007 | Huynh | 310/59 |

(Continued)

FOREIGN PATENT DOCUMENTS

JP        61-280727        12/1986

(Continued)

OTHER PUBLICATIONS

Japanese Office Action dated Jun. 1, 2010, issued in corresponding Japanese Application No. 2009-028749, with English translation.

*Primary Examiner* — Devon Kramer
*Assistant Examiner* — Christopher Maxey
(74) *Attorney, Agent, or Firm* — Nixon & Vanderhye P.C.

(57) ABSTRACT

An electric fuel pump is disclosed which includes a pump portion, a motor portion, a housing, and a fuel passage. The pump portion pressurizes fuel. The motor portion drives the pump portion. The motor portion includes a rotor with a rotating shaft and a stator that surrounds an outer periphery of the rotor. The housing surrounds, at least, an outer periphery of the stator of the motor portion. The fuel passage, through which the fuel pressurized by the pump portion passes the motor portion, is made up of a clearance between the outer periphery of the stator of the motor portion and an inner periphery of the housing. The clearance extends, at least, in the axial direction of the rotating shaft of the rotor of the motor portion.

7 Claims, 8 Drawing Sheets

U.S. PATENT DOCUMENTS

| | | | |
|---|---|---|---|
| 2007/0065314 A1* | 3/2007 | Nagata et al. | 417/423.1 |
| 2007/0086905 A1* | 4/2007 | Nagata et al. | 417/423.3 |
| 2007/0098574 A1 | 5/2007 | Nagata et al. | |
| 2007/0122300 A1* | 5/2007 | Sakai et al. | 417/423.3 |
| 2007/0176511 A1* | 8/2007 | Sakai et al. | 310/218 |
| 2009/0015084 A1* | 1/2009 | Kalavsky et al. | 310/89 |
| 2010/0054972 A1* | 3/2010 | Li et al. | 417/423.7 |
| 2011/0020154 A1* | 1/2011 | Matsuda et al. | 417/410.1 |

FOREIGN PATENT DOCUMENTS

| | | | |
|---|---|---|---|
| JP | 07-259676 | | 10/1995 |
| JP | 2002-354766 | | 12/2002 |
| JP | 2005-110477 | | 4/2005 |
| JP | 2006-101672 | | 4/2006 |
| JP | 2007-127013 | | 5/2007 |
| RU | 2274766 | * | 9/2005 |

* cited by examiner

ELECTRIC FUEL PUMP CAPABLE OF SUPPLYING FUEL AT HIGH FLOW RATE

CROSS-REFERENCE TO RELATED APPLICATION

This application is based on and claims priority from Japanese Patent Applications No. 2008-202608, filed on Aug. 6, 2008, and No. 2009-28749, filed on Feb. 10, 2009, the contents of which are hereby incorporated by reference into this application.

BACKGROUND OF THE INVENTION

1. Technical Field of the Invention

The present invention relates generally to electric fuel pumps that include a pump portion and a motor portion. More particularly, the invention relates to an electric fuel pump that has an improved structure by which the pump can supply fuel at a high flow rate.

2. Description of the Related Art

There is known, for example from Japanese Patent First Publication No. 2005-110477, an electric fuel pump for an internal combustion engine which includes a pump portion and a motor portion. The pump portion sucks fuel from a fuel tank into pump chambers, pressurizes the sucked fuel in the pump chambers, and discharges the pressurized fuel out of the pump chambers via a discharge outlet to the engine side. The motor portion is configured as an inner rotor-type brushless motor and functions as a drive source to drive the pump portion.

Figure 8:
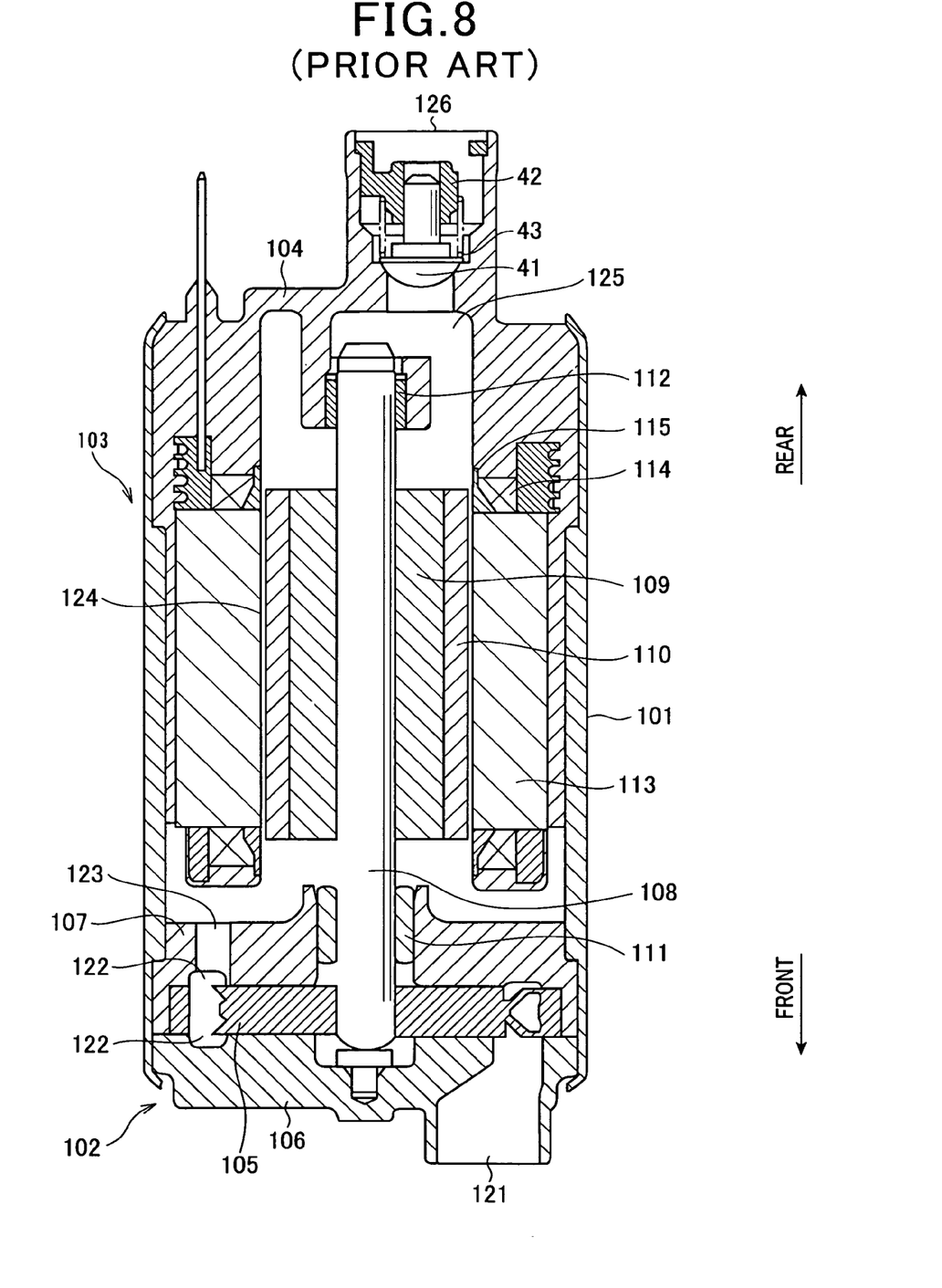
FIG. 8 is a cross-sectional view showing the configuration of a prior art electric fuel pump.

More specifically, as shown in FIG. 8, the electric fuel pump includes a tubular metal housing 101 that receives both the pump portion 102 and the motor portion 103. In the housing 101, the pump portion 102 is located at a front end of the housing 101, and the motor portion 103 is located in a central portion of the housing 101. Further, at a rear end of the housing 101, there is provided a synthetic resin-made end cover 104. In addition, all of the pump portion 102, the motor portion 103, and the end cover 104 are fixed to the housing 101 by crimping both the front and rear ends of the housing 101.

The pump portion 102 includes an impeller 105, which is configured to be driven by the motor portion 103, and a pair of front and rear pump casings 106 and 107 that together receive and rotatably support the impeller 105. The motor portion 103 includes a cylindrical rotor, which is configured to drive the impeller 105 of the pump portion 102, and a hollow cylindrical stator that is disposed to surround the radially outer periphery of the rotor.

The rotor includes a rotating shaft 108, to which the impeller 105 of the pump portion 102 is fixed, a rotor core 109 mounted on the rotating shaft 108, and a permanent magnet 110 that is arranged on the rotor core 109 to form a plurality of magnetic pole portions. In addition, opposite ends of the rotating shaft 108 are respectively rotatable supported by the rear pump casing 107 and end cover 104 via bearings 111 and 112.

The stator includes a stator core 113, stator coils 114, and insulating bobbins 115. The stator core 113 is disposed to surround the radially outer periphery of the magnet 110. The stator coils 114 are wound around teeth of the stator core 113 via the insulating bobbins 115.

The housing 101 encloses the radially outer periphery of the stator core 113, thereby preventing fuel from leaking in the radially outward direction. A suction inlet 121 is formed in the front pump casing 106. The pump chambers 122 are respectively formed between the front pump casing 106 and the impeller 105 and between the impeller 105 and the rear pump casing 107. A pump-motor communication passage 107 is formed in the rear pump casing 107. An annular gap is formed in the motor portion 103 between the outer periphery of the magnet 110 and the inner periphery of the stator core 113; the gap makes up a fuel passage 124 through which the fuel discharged out of the pump portion 102 passes the motor portion 103 toward the discharge outlet 126 formed in the end cover 104.

In operation, the impeller 105 is rotated along with the rotating shaft 108 upon energizing the stator coils 114 of the motor portion 103. With rotation of the impeller 105, fuel is sucked from the fuel tank into the pressure chambers 122 via the suction inlet 121, pressurized in the pressure chambers 122, and discharged out of the pressure chambers 122 via the pump-motor communication passage 123. Then, the fuel flows through the fuel passage 124 formed in the motor portion 103 and a discharge passage 125 formed in the end cover 104. Thereafter, the fuel is discharged out of the electric fuel pump via the discharge outlet 126 to the engine side.

However, with the above-described electric fuel pump, it is difficult to meet the requirement of supplying fuel to the engine at a high flow rate when the engine is used in a recent four-wheel motor vehicle. This is because the cross-sectional area of the fuel passage 124 formed in the motor portion 103 of the electric fuel pump is very small, and thus the pressure drop of the fuel across the motor portion 103 is very large.

To reduce the pressure drop across the motor portion 103, one may consider increasing the cross-sectional area of the fuel passage 124. However, in this case, the annular gap between the outer periphery of the magnet 110 and the inner periphery of the stator core 113 is accordingly increased, thereby increasing the magnetic reluctance between the rotor and stator of the motor portion 103 and decreasing the magnetic attraction between the same. As a result, the efficiency of the motor portion 103 is lowered, making it impossible to supply the fuel to the engine at a high flow rate.

To solve the above problem, Japanese Patent First Publication No. 2007-127013, an English equivalent of which is U.S. Patent Application Publication No. 2007/0098574, discloses an improved electric fuel pump. This electric fuel pump has, in addition to the annular gap formed between the outer periphery of the magnet and the inner periphery of the stator core, clearances provided between circumferentially adjacent pairs of teeth of the stator core on the radially outside of the annular gap. The annular gap makes up a first fuel passage, while the clearances together make up a second fuel passage. Consequently, the fuel discharged out of the pump portion can pass the motor portion through the second fuel passage as well as through the first fuel passage. As a result, the pressure drop across the motor portion can be reduced without lowering the efficiency of the motor portion.

However, for the improved electric fuel pump, there is still a limitation in supplying fuel to the engine at a high flow rate. This is because the clearances, which make up the second fuel passage, are provided between the radially inner ends of the teeth of the stator core, and there is accordingly a limitation in setting the clearances large.

SUMMARY OF THE INVENTION

According to the present invention, there is provided an electric fuel pump which includes a pump portion, a motor portion, a housing, and a fuel passage. The pump portion pressurizes fuel. The motor portion drives the pump portion. The motor portion includes a rotor with a rotating shaft and a stator that surrounds an outer periphery of the rotor. The housing surrounds, at least, an outer periphery of the stator of the motor portion The fuel passage, through which the fuel pressurized by the pump portion passes the motor portion, is made up of a clearance between the outer periphery of the stator of the motor portion and an inner periphery of the housing. The clearance extends, at least, in the axial direction of the rotating shaft of the rotor of the motor portion.

In the above electric fuel pump, since the fuel passage is provided on the outside of the stator of the motor portion, it is possible to set the cross-sectional area of the fuel passage sufficiently large. Consequently, with the fuel passage, it is possible for the fuel pressurized by the pump portion to pass the motor portion at a sufficiently high flow rate.

Moreover, with the fuel passage, it is also possible to reduce a gap between the outer periphery of the rotor and the inner periphery of the stator of the motor portion while ensuring a sufficiently high flow rate of the electric fuel pump. Further, with the reduced gap, the magnetic reluctance between the rotor and stator of the motor portion can be reduced and the magnetic attraction between the same can be increased. As a result, the efficiency of the motor portion can be improved.

Accordingly, the electric fuel pump according to the present invention can supply fuel at a high flow rate without lowering the efficiency of the motor portion.

According to a further implementation of the invention, the stator of the motor portion includes a stator core and a stator coil wound around the stator core. The stator core surrounds the outer periphery of the rotor with a gap formed between the outer periphery of the rotor and an inner periphery of the stator core.

In one embodiment of the invention, the stator core includes a plurality of yoke pieces that are arranged in a circumferential direction of the rotating shaft at predetermined intervals. Each of the yoke pieces includes a pair of end parts, which are opposite to each other in the circumferential direction, and a central part that is interposed between the end parts in the circumferential direction. The central part is maximally away from the inner periphery of the housing in a radial direction of the rotating shaft by a maximum depth of the fuel passage. Moreover, the stator core is composed of a plurality of stator core pieces that are arranged in the circumferential direction of the rotating shaft at the predetermined intervals. Each of the stator core pieces has a yoke portion that makes up one of the yoke pieces. Furthermore, each of the stator core pieces further includes a tooth portion that protrudes radially inward from a radially inner periphery of the yoke portion. The tooth portion has a minimum width that is set to a lower limit of a range of the minimum width within which the amount of magnetic flux transferred between the tooth portion and the rotor is kept at its maximum. In addition, the electric fuel pump further includes a plurality of resin members each of which is formed between the outer periphery of the stator of the motor portion and the inner periphery of the housing to fix the stator to the housing; the resin members are arranged in the circumferential direction of the rotating shaft at predetermined intervals to divide the fuel passage into a plurality of sections.

In another embodiment of the invention, the stator core has a yoke portion that has a polygonal tubular shape and faces the inner periphery of the housing through the fuel passage. The yoke portion includes a plurality of apical parts, which are arranged in a circumferential direction of the rotating shaft at predetermined intervals, and a plurality of central parts each of which is interposed between an adjacent pair of the apical parts in the circumferential direction. Each of the central parts is maximally away from the inner periphery of the housing in a radial direction of the rotating shaft by a maximum depth of the fuel passage. Moreover, the stator core further includes a plurality of tooth portions each of which protrudes radially inward from a radially inner periphery of a corresponding one of the central parts of the yoke portion. Each of the tooth portions has a minimum width that is set to a lower limit of a range of the minimum width within which the amount of magnetic flux transferred between the tooth portion and the rotor is kept at its maximum. In addition, the electric fuel pump may further include a plurality of resin members each of which is formed between the outer periphery of the stator of the motor portion and the inner periphery of the housing to fix the stator to the housing, the resin members may be arranged in the circumferential direction of the rotating shaft at predetermined intervals to divide the fuel passage into a plurality of sections. Otherwise, the stator core may further have a plurality of protrusions each of which protrudes radially outward from a corresponding one of the apical parts of the yoke portion; the protrusions may be press-fitted to the inner periphery of the housing to fix the stator to the housing and divide the fuel passage into a plurality of sections.

Preferably, the motor portion is configured as an inner-rotor type brushless motor.

Preferably, the pump portion is configured as a turbo pump and includes an impeller and a pump casing. The impeller is fixed on an end portion of the rotating shaft to rotate along with the rotating shaft. The pump casing receives therein the impeller and has a pump chamber defined therein. The pump portion is further so configured that with rotation of the impeller, fuel is sucked into the pressure chamber, pressurized in the pressure chamber, and discharged out of the pressure chamber.

Moreover, the electric fuel pump preferably further includes: a fuel converging portion which is formed around an end portion of the rotating shaft and on which the fuel flowing out of the fuel passage converges; at least one connection passage that radially extends to connect the fuel passage to the converging portion; and a discharge outlet which communicates with the converging portion and through which the fuel is discharged out of the electric fuel pump.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Preferred embodiments of the present invention will be described hereinafter with reference to FIGS. 1-7.

It should be noted that, for the sake of clarity and understanding, identical components having identical functions in different embodiments of the invention have been marked, where possible, with the same reference numerals in each of the figures.

[First Embodiment]

FIGS. 1-4 show an electric fuel pump 100 according to the first embodiment of the invention.

In the present embodiment, the electric fuel pump 100 is used in a fuel supply system for an internal combustion engine of, for example, a four-wheel motor vehicle. The fuel supply system includes, in addition to the electric fuel pump 100, a fuel tank (not shown), a fuel delivery pipe (not shown), and a plurality of fuel injectors (not shown). The fuel tank stores fuel, such as gasoline. The electric fuel pump 100 sucks fuel from the fuel tank and pressurizes it. The fuel delivery pipe temporarily stores the fuel pressurized by the electric fuel pump 100. Each of the fuel injectors injects the fuel stored in the fuel delivery pipe into a corresponding one of a plurality of cylinders of the engine at an optimal timing in an intake stroke.

In addition, the fuel delivery pipe is located in an engine compartment of the vehicle. Each of the fuel injectors is mounted on either a cylinder head or an intake manifold of the engine. The electric fuel pump 100 is located inside the fuel tank and connected to the fuel delivery pipe via a flange (not shown) that is fit in a bore formed in a top wall of the fuel tank.

Figure 2:
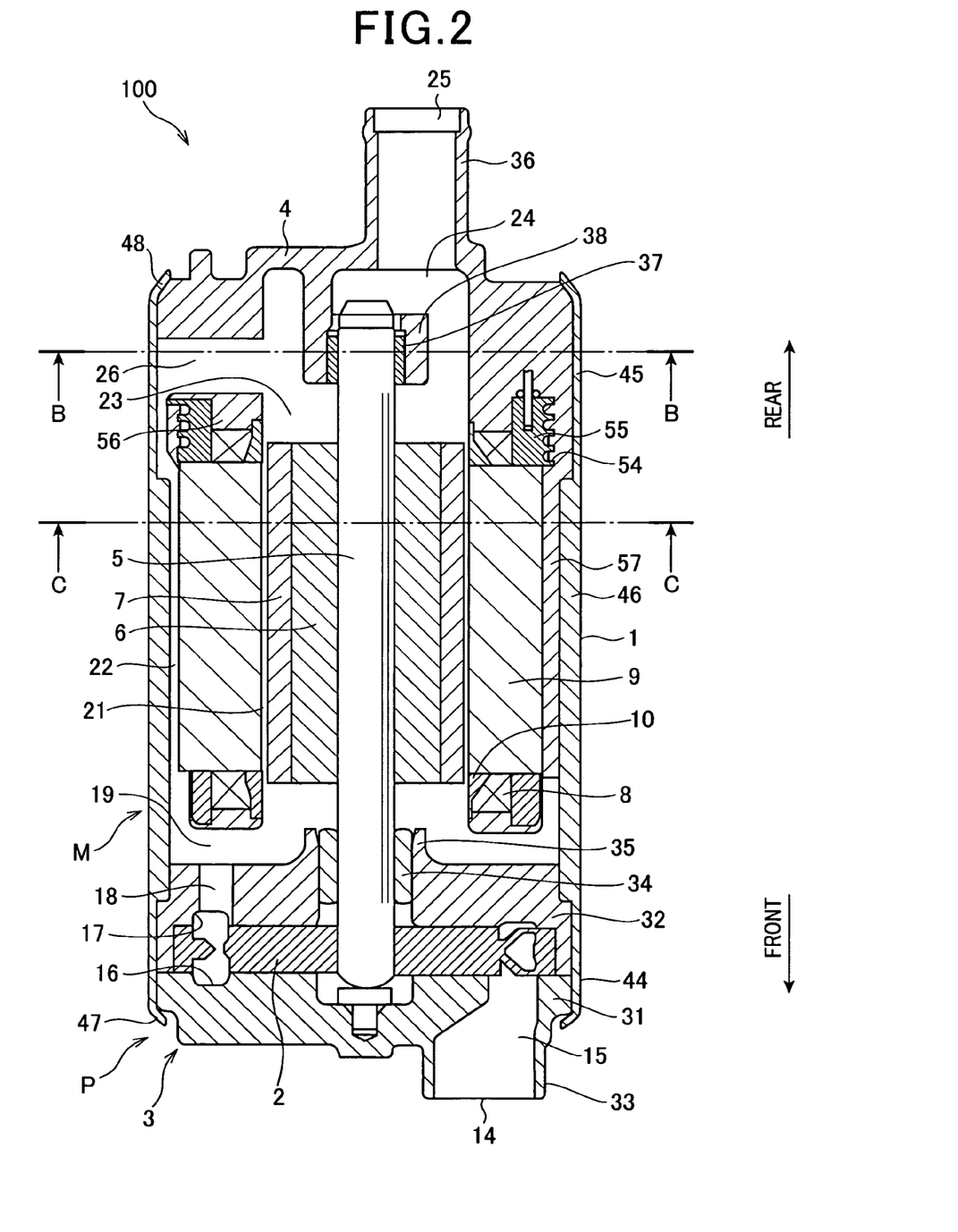
FIG. 2 is a cross-sectional view taken along the line A-A in FIG. 1.

The electric fuel pump 100 includes a pump portion P that pressurizes the fuel, a motor portion M that drives the pump portion P, and a tubular metal housing 1 that receives therein both the pump portion P and the motor portion M. In the housing 1, as shown in FIG. 2, the pump portion P is located at a front end of the housing 1, and the motor portion M is located in a central portion of the housing 1. Further, at a rear end of the housing 1, there is provided a synthetic resin-made end cover 4.

More specifically, in the present embodiment, the housing 1 is formed by press-deforming a thin metal sheet of, for example, 0.5 mm into a hollow cylindrical shape. The cylindrical housing 1 includes thin-wall portions 44 and 45 respectively on the front and rear sides, and a thick-wall portion 46 axially interposed between the thin-wall portions 44 and 45. The motor portion M is press-fitted into the housing 1 to abut the thick-wall portion 46 of the housing 1. The pump portion P is press-fitted into the housing 1 to abut the thin-wall portion 44; then, the front end 47 of the housing 1 is crimped to hermetically seal the pump portion P and the housing 1. The end cover 4 is press-fitted into the housing 1 to abut the thin-wall portion 45; then, the rear end 48 of the housing 1 is crimped to hermetically seal the end cover 4 and the housing 1.

In the present embodiment, the pump portion P is configured as a turbo pump. The pump portion P includes an impeller 2, which is to be driven by the motor portion M, and a pump casing 3 that receives and rotatably supports the impeller 2.

Moreover, in the present embodiment, the pump casing 3 is composed of a pair of front and rear pump casings 31 and 32. The front pump casing 31 has formed therein a suction passage 15. The rear pump casing 32 has formed therein a pump-motor communication passage 18. Moreover, between the front pump casing 31 and the impeller 2, there is defined a front pump chamber 16 that has a substantially U-shaped cross section; similarly between the rear pump casing 32 and the impeller 2, there is defined a rear pump chamber 17 that also has a substantially U-shaped cross section. A suction pipe 33 is integrally formed with the front pump casing 31 at the front end of the front pump casing 31. The suction pipe 33 has formed, at the front end thereof, a suction inlet 14 which communicates with the suction passage 15 formed in the front pump casing 31.

The impeller 2, which makes up a rotor of the pump portion P, has a substantially discoid shape and is rotatable interposed between the front and rear pump casings 31 and 32. The impeller 2 has, on each side thereof, a plurality of blades or fins. The impeller 2 is press-fitted on a front end portion of a rotating shaft 5 of the motor portion M, so as to rotate along with the rotating shaft 5. In addition, the front end portion of the rotating shaft 5 is rotatably supported by the rear pump casing 32 via a bearing 34. The bearing 34 is press-fitted in a bore formed in a central portion 35 of the rear pump casing 32. The front end portion of the rotating shaft 5 is fitted in a bore of the bearing 34 with a predetermined clearance between the front end portion and an inner wall of the bearing 34 defining the bore, so that the front end portion makes sliding contact with the inner wall of the bearing 34 during rotation of the rotating shaft 5.

When the impeller 2 is rotated along with the rotating shaft 5, fuel is sucked from the fuel tank into the pump chambers 16 and 17 via the suction inlet 14 and suction passage 15, pressurized in the pump chambers 16 and 17, and discharged out of the pump chambers 16 and 17 via the pump-motor communication passage 18.

The fuel flowing out of the pump-motor communication passage 18 is diverged, from a fuel diverging portion 19 (i.e., a space formed between the rear pump casing 32 and the motor portion M), into a first fuel passage 21 and a second fuel passage 22. Both the first and second fuel passages 21 and 22 are formed in the motor portion M and to be described in detail later.

The diverged fuel pass the motor portion M through both the first and second fuel passages 21 and 22, and converge on a fuel converging portion 23 (i.e., a space formed between the motor portion M and the end cover 4 around the rotating shaft 5). Then, the fuel is discharged out of the electric fuel pump 100 via a discharge passage 24 and a discharge outlet 25.

Figure 3:
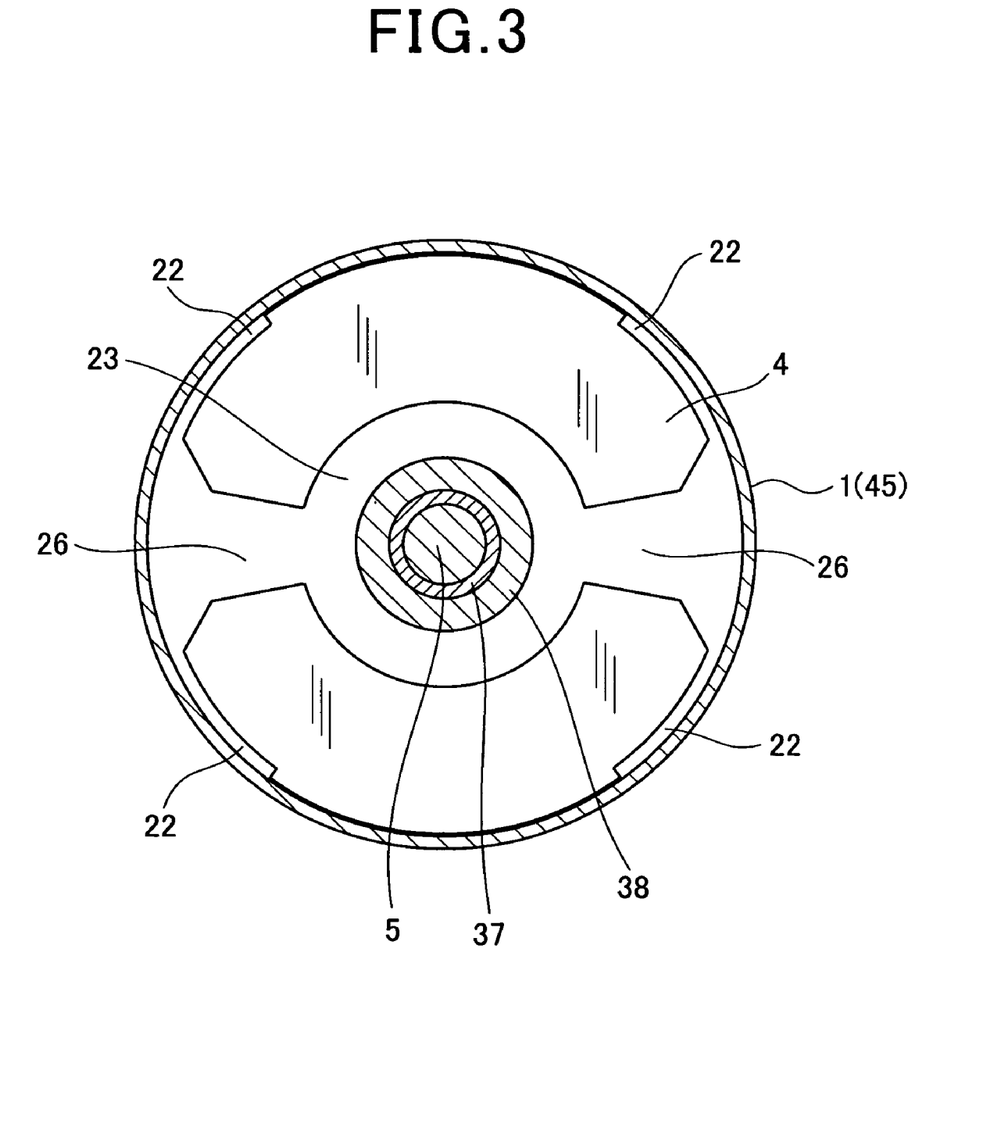
FIG. 3 is a cross-sectional view taken along the line B-B in FIG. 2.

In addition, the first fuel passage 21 directly communicates with the converging portion 23. On the other hand, the second fuel passage 22 communicates with the converging portion 23 via connection passages 26 that are formed, as shown in FIG. 3, in the end cover 4 to extend radially outward from the converging portion 23 to the second fuel passage 22.

The discharge passage 24 is formed in the end cover 4 offset from the axis of the rotating shaft 5 in the radial direction. A discharge pipe 36 is integrally formed with the end cover 4 so as to be located at the rear end of the end cover 4. The discharge pipe 36 has formed, at the rear end thereof, the discharge outlet 25 that communicates with the discharge passage 24 formed in the end cover 4. In addition, a rear end portion of the rotating shaft 5 is rotatably supported by the end cover 4 via a bearing 37. The bearing 37 is press-fitted in a bore formed in a central portion 38 of the end cover 4. The rear end portion of the rotating shaft 5 is fitted in a bore of the bearing 37 with a predetermined clearance between the rear end portion and an inner wall of the bearing 37 defining the bore, so that the rear end portion makes sliding contact with the inner wall of the bearing 37 during rotation of the rotating shaft 5.

Moreover, inside the discharge pipe 36, there are disposed a check valve 41, a stopper 42, and a spring 43, all of which are omitted from FIG. 2 but are shown in FIG. 8. When the fuel pressure in the discharge passage 24 (denoted by 125 in FIG. 8) has increased to exceed a predetermined value, the check valve 41 is moved backward against the load of the spring 43, thereby allowing the fuel to be discharged of the discharge passage 24 through the discharge outlet 25. In addition, the stopper 42 is provided to stop backward movement of the spring 43.

In the present embodiment, the motor portion M is configured as an inner rotor-type brushless motor.

More specifically, the motor portion M includes a cylindrical rotor that drives the impeller 2 of the pump portion P, and a hollow cylindrical stator that surrounds the radially outer periphery of the rotor with an annular gap formed between the radially outer periphery of the rotor and the radially inner periphery of the stator. In addition, the radially outer periphery of the stator is surrounded by the thick-wall portion 46 of the housing 1 with clearances provided between the radially outer periphery of the stator and the radially inner periphery of the thick-wall portion 46.

Moreover, in the present embodiment, the annular gap between the radially outer periphery of the rotor and the radially inner periphery of the stator makes up the first fuel passage 21. The clearances between the radially outer periphery of the stator and the radially inner periphery of the thick-wall portion 46 of the housing 1 together make up the second fuel passage 22. Each of the first and second fuel passages 21 and 22 extends at least in the axial direction of the rotating shaft 5. In addition, at least part of each of the first and second fuel passages 21 and 22 extends straight in the axial direction of the rotating shaft 5.

The rotor of the motor portion M includes the rotating shaft 5, to which the impeller 2 of the pump portion P is fixed, a rotor core 6 that is made of a magnetic material and mounted on the rotating shaft 5, and a permanent magnet 7 fixed on the radially outer periphery of the rotor core 6.

In the present embodiment, the magnet 7 is implemented by a cylindrical resin magnet that is formed by mixing power of a magnetic material with power of a synthetic resin, such as polyphenylene sulfide (PPS) or polyacetal (POM), and kneading and shaping the powder mixture into a hollow cylinder. The magnet 7 is mounted on the rotor core 6 to surround the radially outer periphery of the rotor core 6. The magnet 7 has a plurality of (e.g., four in the present embodiment) magnetic pole portions that are formed on the radially outer periphery of the magnet 7 and arranged in the circumferential direction of the magnet 7 at predetermined intervals (e.g., even intervals of 90°). Moreover, the magnetic pole portions of the magnet 7 are so magnetized that the polarities of the magnetic pole portions alternately change between north and south in the circumferential direction of the magnet 7.

The stator includes a hollow cylindrical stator core, which is disposed to surround the magnet 7 with the annular gap formed between the radially outer periphery of the magnet 7 and the radially inner periphery of the stator core, and a plurality of (e.g., six in the present embodiment) stator coils 8 wound around the stator core.

In the present embodiment, the stator core is composed of six stator core pieces 9 that are arranged in the circumferential direction of the stator core (or the circumferential direction of the rotating shaft 5) at even intervals. Each of the stator core pieces 9 includes a yoke portion 11, which is arranged on the radially outer side of the stator core to extend perpendicular to the radial direction of the stator core, and a tooth portion 12 that protrudes radially inward from the yoke portion 11. Moreover, for each of the stator core pieces 9, a pair of insulating bobbins 10 are respectively arranged on circumferentially opposite sides of the stator core piece 9 to cover the radially inner surface of the yoke portion 11 and the side surfaces of the tooth portion 12. The insulating bobbins 10 are made, for example, a synthetic resin.

Figure 1:
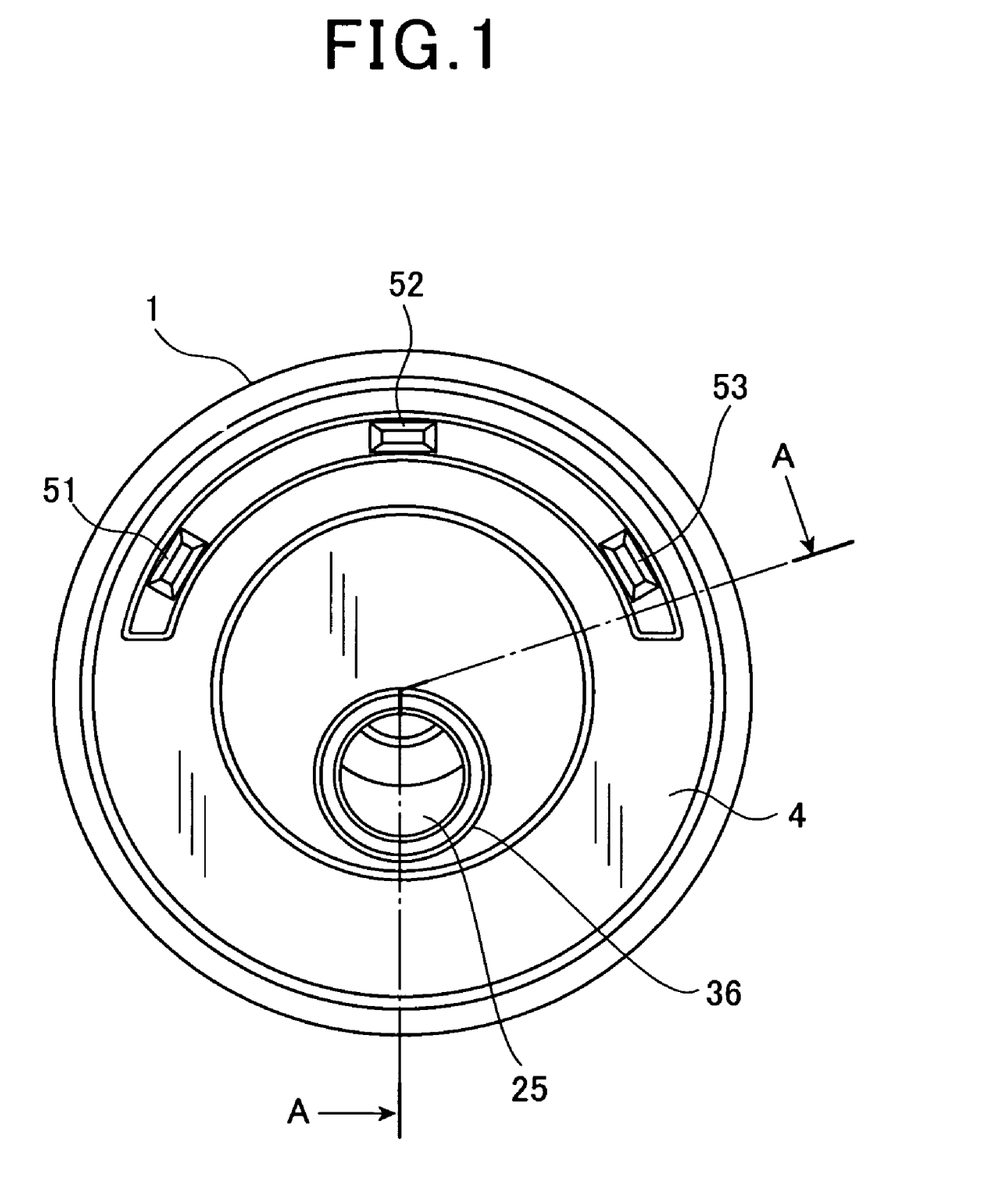
FIG. 1 is an end view of an electric fuel pump according to the first embodiment of the invention.

Each of the stator coils 8 is wound, before assembly of the stator core, around a corresponding one of the stator core pieces 9 via the corresponding bobbins 10 in the manner of concentrated winding. Moreover, each of the stator coils 8 is electrically connected to one of terminals 51, 52, and 53 provided in the end cover 4 as shown in FIG. 1.

Furthermore, in the present embodiment, the stator coils 8, the stator core pieces 9, and the insulating bobbins 10 are fixed with respect to each other by resin members 56 that are integrally molded with resin members 55, 57, 58 and the end cover 4.

Figure 4:
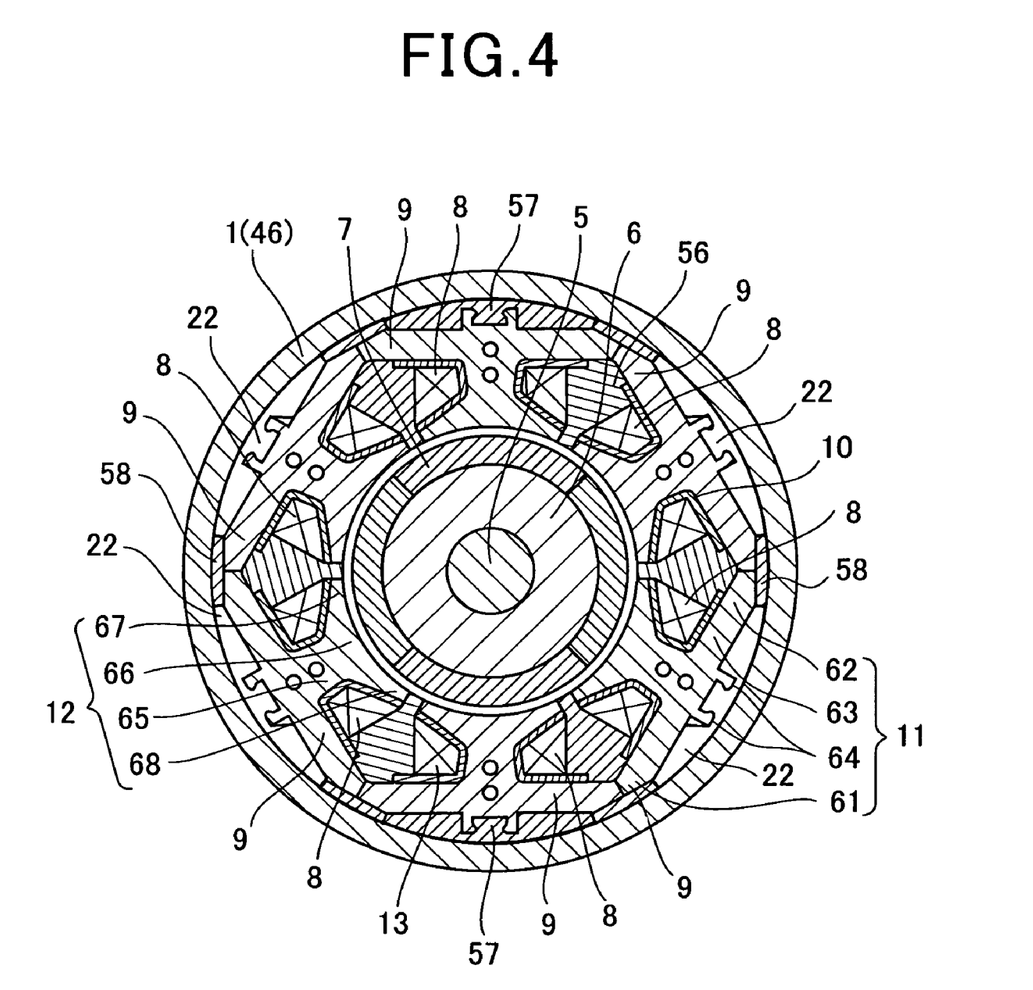
FIG. 4 is a cross-sectional view taken along the line C-C in FIG. 2.

More specifically, as shown in FIG. 4, each of the resin members 56 is molded to fill one of the spaces formed between circumferentially adjacent pairs of the stator coils 8. The resin members 55 are molded, as shown in FIG. 2, to serve as hooks for hooking connecting wires 54 that connect the stator coils 8.

Each of the resin members 57 and 58 is molded, as shown in FIGS. 2 and 4, to extend forward from a radially outer portion of the end cover 4 along the radially inner periphery of the housing 1 to cover a part of the radially outer periphery of the stator core. Consequently, with the resin members 57 and 58, the stator core is fixed to the end cover 4. Moreover, the resin members 57 and 58 also connect the yoke portions 11 of circumferentially adjacent pairs of the stator core pieces 9, and divide the second fuel passage 22 formed between the radially outer periphery of the stator core and the radially inner periphery of the housing 1 into a plurality of (e.g., four in the present embodiment) sections. In addition, the circumferential width of the resin members 57 is set greater than that of the resin members 58.

In the present embodiment, each of the stator core pieces 9 is formed by laminating a plurality of magnetic steel sheets and fixing them together by swaging. Moreover, between each circumferentially adjacent pair of the stator core pieces 9, there is formed a slot 13 which is filled with the corresponding stator coils 8, bobbins 10, and resin member 56.

In each of the stator core pieces 9, the yoke portion 11 includes end parts 61 and 62, which are opposite to each other in the circumferential direction of the stator core, and a central part 63 interposed between the end parts 61 and 62 in the circumferential direction. The central part 63 is maximally away from the radially inner periphery of the housing 1 in the radial direction of the stator core (or the radial direction of the rotating shaft 5) by the maximum depth of the second fuel passage 22. Moreover, the thickness of the yoke portion 11 is almost constant from the end part 61, via the central part 63, to the end part 62. In addition, on the radially outer periphery of the central part 63, there are formed a pair of ribs 64 for positioning the magnetic steel sheets during the formation of the stator core piece 9.

In the present embodiment, as shown in FIG. 2, there are provided six stator core pieces 9 (i.e., the left-top, top, right-top, right-bottom, bottom, and left-bottom stator core pieces 9), two resin members 57 (i.e., the top and bottom resin members 57), and two resin members 58 (i.e., the left and right resin members 58).

More specifically, the top resin member 57 is formed to fill the clearance between the radially outer periphery of the end part 61 of the yoke portion 11 of the left-top stator core piece 9 and the radially inner periphery of the housing 1, the clearance between the radially outer periphery of the entire yoke portion 11 of the top stator core piece 9 and the radially inner periphery of the housing 1, and the clearance between the radially outer periphery of the end part 62 of the yoke portion 11 of the right-top stator core piece 9 and the radially inner periphery of the housing 1. Consequently, with the top resin member 57, the left-top, top; and right-top stator core pieces 9 are fixed together.

The bottom resin member 57 is formed to fill the clearance between the radially outer periphery of the end part 61 of the yoke portion 11 of the right-bottom stator core piece 9 and the radially inner periphery of the housing 1, the clearance between the radially outer periphery of the entire yoke portion 11 of the bottom stator core piece 9 and the radially inner periphery of the housing 1, and the clearance between the radially outer periphery of the end part 62 of the yoke portion 11 of the left-bottom stator core piece 9 and the radially inner periphery of the housing 1. Consequently, with the bottom resin member 57, the right-bottom, bottom, and left-bottom stator core pieces 9 are fixed together.

The left resin member 58 is formed to fill the clearance between the radially outer periphery of the end part 61 of the yoke portion 11 of the left-bottom stator core piece 9 and the radially inner periphery of the housing 1 and the clearance between the radially outer periphery of the end part 62 of the yoke portion 11 of the left-top stator core piece 9 and the radially inner periphery of the housing 1. Consequently, with the left resin member 58, the left-bottom and left-top stator core pieces 9 are fixed together.

The right resin member 58 is formed to fill the clearance between the radially outer periphery of the end part 61 of the yoke portion 11 of the right-top stator core piece 9 and the radially inner periphery of the housing 1 and the clearance between the radially outer periphery of the end part 62 of the yoke portion 11 of the right-bottom stator core piece 9 and the radially inner periphery of the housing 1. Consequently, with the right resin member 58, the right-top and right-bottom stator core pieces 9 are fixed together.

Accordingly, with the above formation of the resin members 57 and 58, the clearances between the radially inner periphery of the housing 1 and the radially outer peripheries of the central parts 63 of the yoke portions 11 of the left-top, right-top, right-bottom, and left-bottom stator core pieces 9 remain unfilled to respectively make up four sections of the second fuel passage 22.

In the present embodiment, in each of the stator core pieces 9, the tooth portion 12 protrudes radially inward from the radially inner periphery of the central part 63 of the yoke portion 11. As shown in FIG. 4, the tooth portion 12 includes a body part 65, an end part 66, and a pair of collar parts 67 and 68. The body part 65 extends straight from the radially inner periphery of the central part 63 of the yoke portion 12; around the body part 65, the corresponding stator coil 8 is wound in a predetermined number of turns. The end part 66 faces the magnet 7 of the rotor in the radial direction of the rotating shaft 5 through the annual gap formed between the stator and the rotor. The collar parts 67 and 68 extend from the end part 66 respectively toward opposite sides in the circumferential of the stator (or the circumferential direction of the rotating shaft 5).

Moreover, in the present embodiment, the minimum width T of the tooth portion 12 (i.e. the width of the body part 65 of the tooth portion 12) is set to the lower limit of an optimal range of the minimum width T within which the amount of the magnetic flux transferred between the tooth portion 12 and the rotor is kept at its maximum.

More specifically, the amount of the magnetic flux transferred between the tooth portion 12 and the rotor increases with increase in the minimum width T of the tooth portion 12. However, when the minimum width T of the tooth portion 12 has increased to reach the optimal range, the amount of the magnetic flux no longer increases with increase in the minimum width T and is kept constant at its maximum. Therefore, the lower limit of the optimal range represents the smallest value of the minimum width T which ensures the maximum amount of the magnetic flux transferred between the tooth portion 12 and the rotor.

After having described the configuration of the electric fuel pump 100, operation thereof will be described hereinafter.

When the stator coils 8 of the stator of the motor portion M are energized, the rotor of the motor portion M rotates with respect to the stator and the housing 1. Since the impeller 2 of the pump portion P is fixed to the rotating shaft 5 of the rotor of the motor portion M, it is driven by the motor portion M to rotate along with the rotating shaft 5. Then, with rotation of the impeller 2, fuel is sucked from the fuel tank into the pump chambers 16 and 17 via the suction inlet 14 and suction passage 15, pressurized in the pump chambers 16 and 17, and discharged out of the pump chambers 16 and 17 via the pump-motor communication passage 18.

The majority of the fuel discharged out of the pump portion P flows to the motor portion M, while the rest of the fuel flows into the clearance between the bore of the bearing 34 and the front end portion of the rotating shaft 5 to function as a lubricant. Moreover, the fuel flowing to the motor portion M diverges, from the fuel diverging portion 19 formed between the rear pump casing 32 and the stator of the motor portion M, into the first and second fuel passages 21 and 22.

The fuel flowing into the first fuel passage 21 passes the motor portion M through the annular gap between the radially outer periphery of the magnet 7 of the rotor and the radially inner periphery of the stator core of the stator, and converges on the fuel converging portion 23 formed between the rotor of the motor portion M and the end cover 4. On the other hand, the fuel flowing into the second fuel passage 22 passes the motor portion M through the clearances between the radially outer periphery of the stator core of the motor portion M and the radially inner periphery of the thick-wall portion 46 of the housing 1, and converges on the fuel converging portion 23 via the connection passages 26.

The majority of the fuel having converged on the converging portion 23 directly flows into the discharge passage 24; the rest of the fuel flows into the clearance between the bore of the bearing 37 and the rear end portion of the rotating shaft 5 to function as a lubricant, and then flows into the discharge passage 24. All the fuel flowing into the discharge passage 24 is finally discharged out of the electric fuel pump 100 via the discharge outlet 25 to the fuel delivery pipe.

The above-described electric fuel pump 100 according to the present embodiment has the following advantages.

In the present embodiment, there are provided in the electric fuel pump 100 both the first and second fuel passages 21 and 22, through which the fuel pressurized by the pump portion P passes the motor portion M. The first fuel passage 21 is made up of the annular gap formed between the radially outer periphery of the rotor and the radially inner periphery of the stator of the motor portion M. On the other hand, the second fuel passage 22 is made up of the clearances provided between the radially outer peripheries of the stator core pieces 9 and the radially inner periphery of the thick-wall portion of the housing 1.

Since the second fuel passage 22 is provided on the radially outside of the stator of the motor portion M, it is possible to set the cross-sectional area of the second fuel passage 22 sufficiently large. Consequently, with the second fuel passage 22, it is possible for the fuel pressurized by the pump portion P to pass the motor portion M at a sufficiently high flow rate.

Moreover, with the second fuel passage 22, it is also possible to reduce the annular gap between the radially outer periphery of the rotor and the radially inner periphery of the stator (i.e., the first fuel passage 21) while ensuring a sufficiently high flow rate of the electric fuel pump 100. Further, with the reduced annular gap, the magnetic reluctance between the rotor and stator of the motor portion M can be reduced and the magnetic attraction between the same can be increased. As a result, the efficiency of the motor portion M can be improved.

Accordingly, the electric fuel pump 100 according to the present embodiment can supply fuel to the engine at a high flow rate without lowering the efficiency of the motor portion M.

Figure 5:
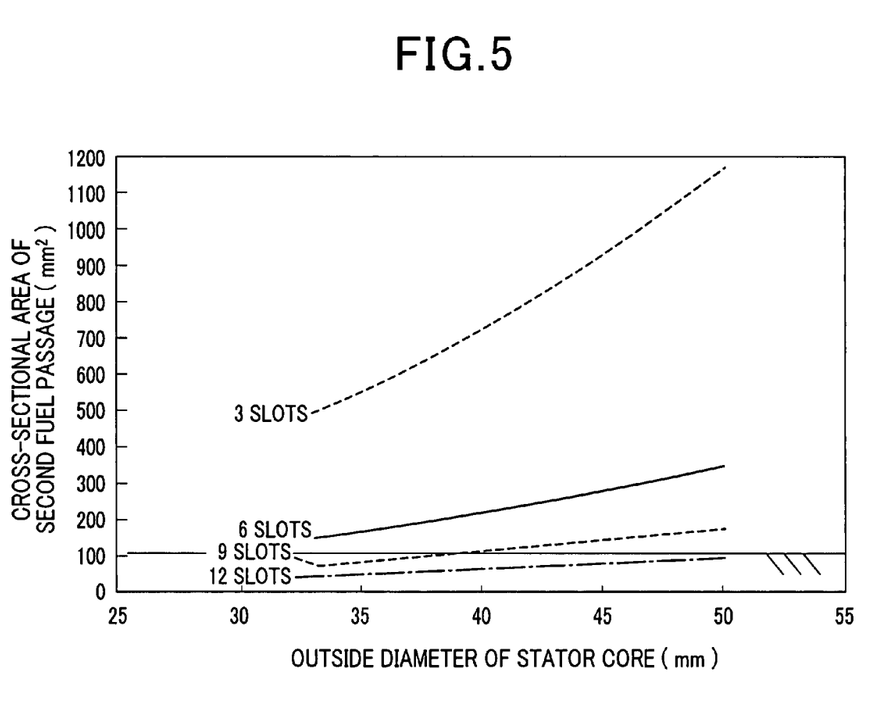
FIG. 5 is a graphical representation illustrating the relationship in the electric fuel pump between the outside diameter of a stator core, the cross-sectional area of a second fuel passage, and the number of slots formed in the stator core.

In addition, considering the fuel consumption of a recent four-wheel motor vehicle, it is necessary for the second fuel passage 22 to have a cross-sectional area greater than or equal to 100 mm$^2$. On the other hand, with increase in the number of the stator core pieces 9 (i.e., the number of the slots 13 formed in the stator core), the efficiency of the motor portion M increases, but the cross-sectional area of the second fuel passage 22 decreases. In consideration of the above, as shown in FIG. 5, in the case of the stator core having an outside diameter of 45 mm, it is preferable to set the number of the slots 13 to nine.

Moreover, in the present embodiment, in each of the stator core pieces 9, the yoke portion 11 includes the end parts 61 and 62, which are opposite to each other in the circumferential direction of the rotating shaft 5, and the central part 63 interposed between the end parts 61 and 62 in the circumferential direction. The central part 63 is formed to be maximally away from the radially inner periphery of the housing 1 in the radial direction of the rotating shaft 5 by the maximum depth of the second fuel passage 22.

With the above configuration, the second fuel passage 22 can be formed by recessing the radially outer periphery of the stator core inward, without protruding the inner periphery of the housing 1 outward. Further, recessing the radially outer periphery of the stator core has almost no influence on the magnetic properties of the stator core.

Consequently, with the above configuration, it is possible to secure a high flow rate of the electric fuel pump 100 without increasing the outside diameter of the housing 1 and without lowering the efficiency of the motor portion M.

In addition, the yoke portions 11 of the stator core pieces 9 together make up a yoke of the motor portion M. In other words, each of the yoke portions 11 of the stator core pieces 9 can be seen as a piece of the yoke of the motor portion M.

In the present embodiment, the stator core is composed of the stator core pieces 9 that are arranged in the circumferential direction of the rotating shaft 5 at the even intervals. Each of the stator core pieces 9 includes the yoke portion 11 and the tooth portion 12 that protrudes radially inward from the radially inner periphery of the yoke portion 11.

With the above configuration of the stator core, each of the stator coils 8 can be easily wound, before assembly of the stator core, around the tooth portion 12 of a corresponding one of the stator core pieces 9 without being interfered with by other stator core pieces 9.

Moreover, each of the stator coils 8 can be wound around the tooth portion 12 of the corresponding stator core piece 9 in the manner of concentrated winding and/or in the manner of regular winding. Consequently, the space factor of the stator coils 8 can be improved, thereby making it possible to downsize the motor portion M.

In the present embodiment, in each of the stator core pieces 9, the minimum width T of the tooth portion 12 is set to the lower limit of the optimal range of the minimum width T within which the amount of the magnetic flux transferred between the tooth portion 12 and the rotor is kept constant at its maximum.

Setting the minimum width T as above, it is possible to ensure the maximum amount of the magnetic flux transferred between the tooth portion 12 and the rotor without making the tooth portion 12 unnecessarily thick. Consequently, it is possible to secure a sufficiently large space for the corresponding stator coil 8, thereby ensuring a high efficiency of the motor portion M.

In the present embodiment, the motor portion M is configured as an inner-rotor type brushless motor.

In general, an inner-rotor type brushless motor has a higher efficiency than a brushed motor. This is because in the brushless motor, there is no loss caused by a sliding resistance between a commutator and brushes, an electric resistance between the same, and a fluid resistance to the grooves formed between segments of the commutator. Therefore, with the above configuration of the motor portion M, it is possible to ensure a high efficiency of the motor portion M.

In the present embodiment, the pump portion P is configured as a turbo pump to include the impeller 2 and the pump casing 3. The impeller 2 is fixed on the front end portion of the rotating shaft 5 to rotate along with the rotating shaft 5. The pump casing 3 receives therein the impeller 2 and has the pump chambers 16 and 17 defined therein. In operation, with rotation of the impeller 2, fuel is sucked into the pressure chambers 16 and 17, pressurized in the pressure chambers 16 and 17, and discharged out of the pressure chambers 16 and 17.

With the above configuration of the pump portion P, it is possible for the electric fuel pump 100 to supply fuel to the engine in a continuous manner with rotation of the impeller 2.

In the present embodiment, the electric fuel pump 100 further includes the fuel converging portion 23, on which all the fuel flowing out of the first and second fuel passages 21 and 22 converge, the connection passages 26, and the discharge outlet 25. The fuel converging portion 23 is formed around the rear end portion of the rotating shaft 5. The connection passages 26 radially extend to connect the second fuel passage 22 to the converging portion 23. The discharge outlet 25, through which the pressurized fuel is discharged out of the electric fuel pump 100, communicates with the fuel converging portion 23.

With the above configuration, the fuels flowing out of the first and second fuel passages 21 and 22 first merge with each other in the fuel converging portion 23, and then flow to the discharge outlet 25. Therefore, compared to the case of having no fuel converging portion, it is possible to reduce the fuel pressure drop that occurs between the motor portion M and the discharge outlet 25.

In addition, in the present embodiment, each of the resin members 56 is formed to fill one of the spaces formed between circumferentially adjacent pairs of the stator coils 8; consequently, the stator coils 8 are reliably prevented from being exposed to the fuel flowing through the motor portion M. Part of the fuel discharged out of the pump portion P flows into the clearance between the bore of the bearing 34 and the front end portion of the rotating shaft 5 to function as a lubricant; consequently, the sliding resistance between the bearing 34 and the front end portion can be reduced. Part of the fuel flowing out of the converging portion 23 flows into the clearance between the bore of the bearing 37 and the rear end portion of the rotating shaft 5 to function as a lubricant; consequently, the sliding contact between the bearing 37 and the rear end portion can be reduced.

[Second Embodiment]

Figure 6:
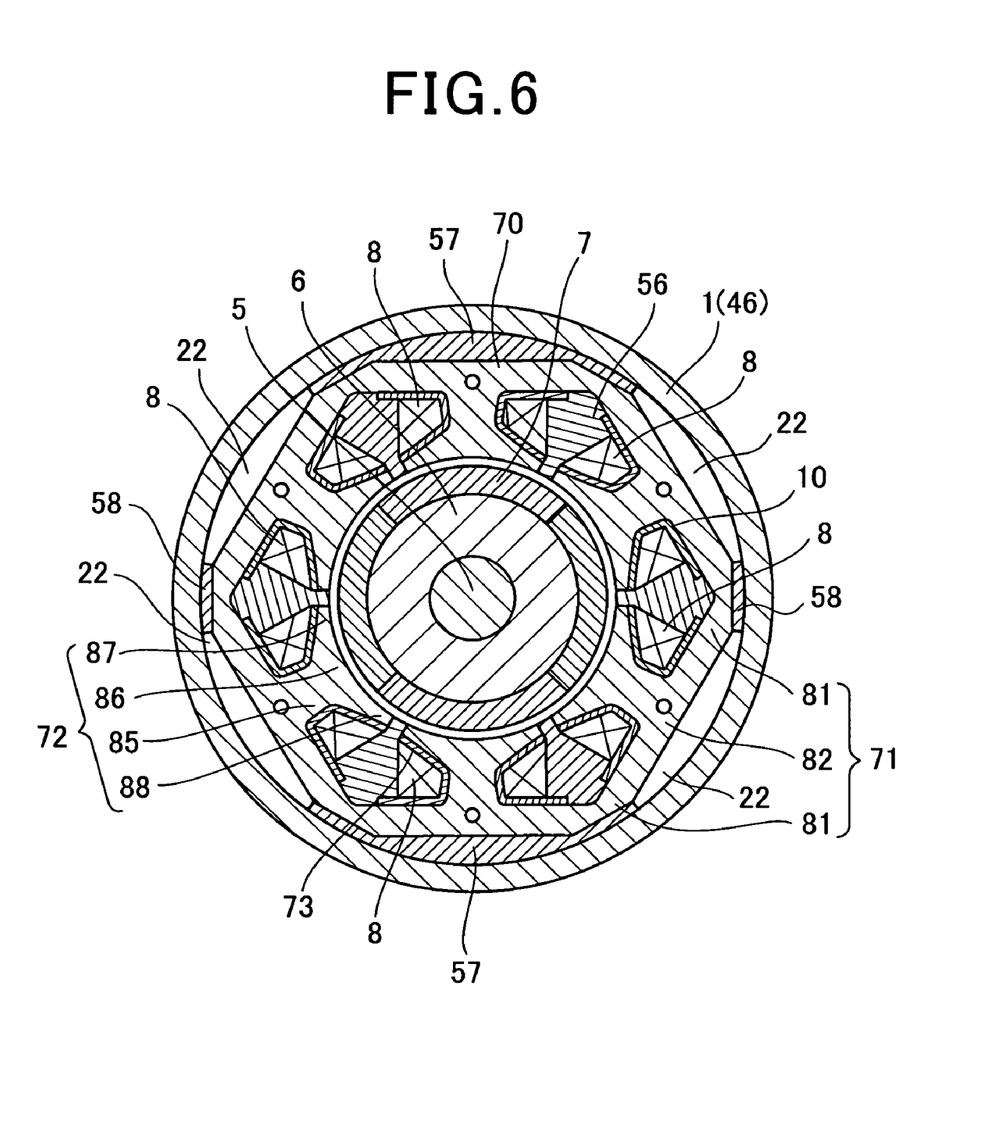
FIG. 6 is a cross-sectional view showing the configuration of a motor portion according to the second embodiment of the invention.

FIG. 6 shows the motor portion M according to the second embodiment of the invention. This motor portion M has almost the same configuration as the motor portion M according to the first embodiment; therefore, only the differences therebetween will be described hereinafter.

As described previously, in the first embodiment, the motor portion M includes the stator core that is composed of the plurality of stator core pieces 11.

In comparison, in the present embodiment, as shown in FIG. 6, the motor portion M includes a stator core 70 that is formed in one piece and continuously extends to enclose the entire radially outer periphery of the magnet 7 of the rotor.

More specifically, the stator core 70 includes a yoke portion 71 and a plurality of tooth portions 72. The yoke portion 71 has the shape of a polygonal tube and faces the radially inner periphery of the housing 1 through the second fuel passage 22. Each of the tooth portions 72 protrudes radially inward from the radially inner periphery of the yoke portion 71.

The stator core 70 is formed by laminating a plurality of polygonal annular magnetic steel sheets and fixing them together by swaging. Moreover, between each circumferentially adjacent pair of the tooth portions 72, there is formed a slot 73 which is filled with the corresponding stator coils 8, bobbins 10, and resin member 56.

The polygonal tubular yoke portion 71 includes a plurality of apical parts 81, which are arranged in the circumferential direction of the yoke portion 71 (or the circumferential direction of the rotating shaft 5) at predetermined intervals, and a plurality of central parts 82 each of which is interposed between an adjacent pair of the apical parts 81 in the circumferential direction.

In the present embodiment, each of the central parts 82 is maximally away from the radially inner periphery of the housing 1 in the radial direction of the stator core 70 (or the radial direction of the rotating shaft 5) by the maximum depth of the second fuel passage 22. Moreover, the thickness of the yoke portion 71 is almost constant in the circumferential direction of the stator core 70 (or the circumferential direction of the rotating shaft 5). In addition, both the number of the apical parts 81 and the number of the central parts 82 are the same as the number of the tooth portions 72.

Each of the tooth portions 72 protrudes radially inward from the radially inner periphery of a corresponding one of the central parts 82 of the yoke portion 71. As shown in FIG. 6, each of the tooth portions 72 includes a body part 85, an end part 86, and a pair of collar parts 87 and 88. The body part 85 extends straight from the radially inner periphery of the corresponding central part 82 of the yoke portion 71; around the body part 85, the corresponding stator coil 8 is wound in the manner of concentrated winding. The end part 86 faces the magnet 7 of the rotor in the radial direction of the rotating shaft 5 through the annual gap formed between the stator and the rotor. The collar parts 87 and 88 extend from the end part 86 respectively toward opposite sides in the circumferential of the stator (or the circumferential direction of the rotating shaft 5).

Moreover, in the present embodiment, the minimum width T of each of the tooth portions 72 (i.e., the width of the body part 85 of the tooth portion 72) is set to the lower limit of an optimal range of the minimum width T within which the amount of the magnetic flux transferred between the tooth portion 72 and the rotor is kept at its maximum.

Each of the resin members 56 is formed to fill one of the spaces formed between circumferentially adjacent pairs of the stator coils 8. Each of the resin members 57 and 58 is formed to extend, from a radially outer portion of the end cover 4, in the axial direction of the rotating shaft 5 along the radially inner periphery of the thick-wall portion 46 of the housing 1 to cover a part of the radially outer periphery of the stator core 70. Consequently, with the resin members 57 and 58, the stator core 70 is fixed to the end cover 4 and the housing 1. Moreover, the resin members 57 and 58 also divide the second fuel passage 22 formed between the radially outer periphery of the stator core 70 and the radially inner periphery of the housing 1 into a plurality of (e.g., four in the present embodiment) sections.

In addition, the circumferential width of the resin members 57 is set greater than that of the resin members 58. More specifically, as shown in FIG. 6, the top resin member 57 covers the radially outer peripheries of the left-top apical part 81, top central part 82, and right-top apical part 81; the bottom resin member 57 covers the radially outer peripheries of the left-bottom apical part 81, bottom central part 82, and right-bottom apical part 81. On the other hand, the left resin member 58 only covers the radially outer periphery of the left apical part 81; the right resin member 58 only covers the radially outer periphery of the right apical part 81.

[Third Embodiment]

Figure 7:
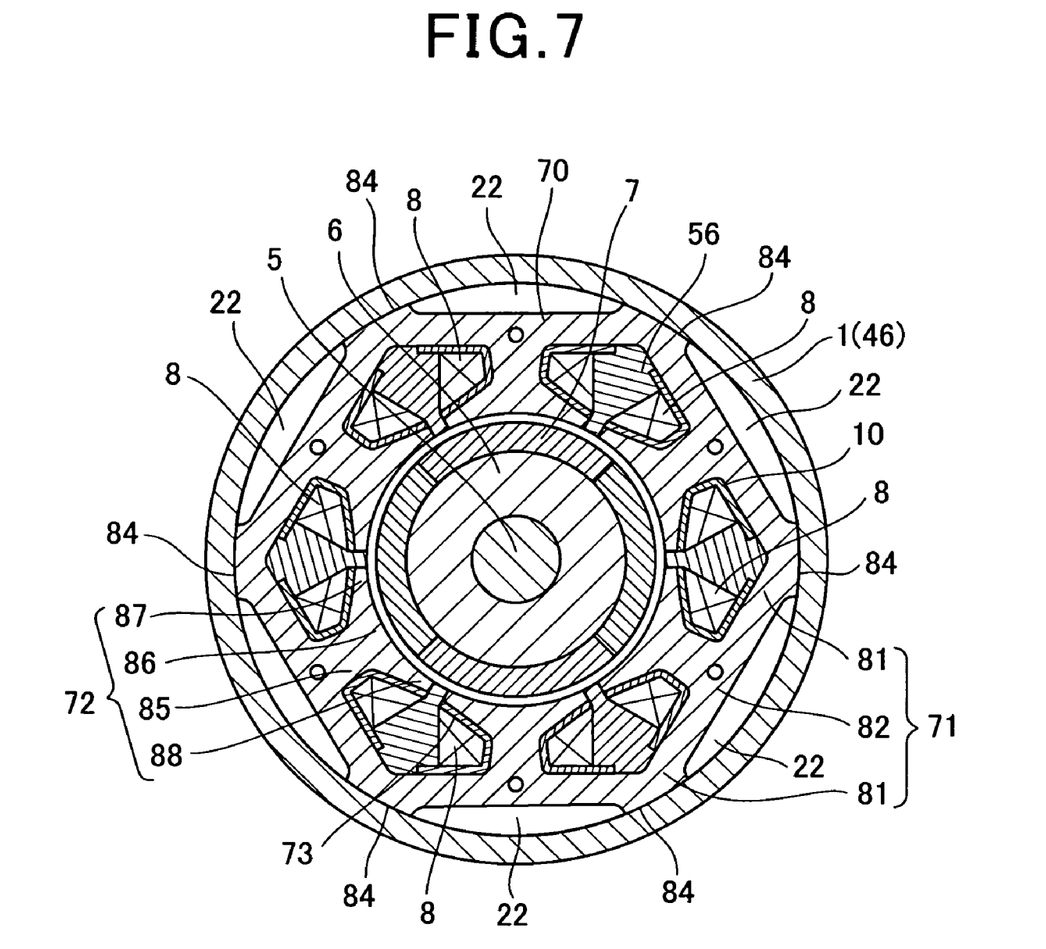
FIG. 7 is a cross-sectional view showing the configuration of a motor portion according to the third embodiment of the invention.

FIG. 7 shows the motor portion M according to the third embodiment of the invention. This motor portion M has almost the same configuration as the motor portion M according to the second embodiment; therefore, only the differences therebetween will be described hereinafter.

As described previously, in the second embodiment, the motor portion M includes the resin members 57 and 58 by which the second fuel passage 22 is divided into the plurality of sections and the stator core 7 is fixed to the housing 1.

In comparison, in the present embodiment, as shown in FIG. 7, the resin members 57 and 58 are omitted from the motor portion M. Instead, the stator core 70 further has a plurality of (e.g., six in the present embodiment) protrusions 84 for performing the functions of the resin members 57 and 58.

More specifically, each of the protrusions 84 protrudes radially outward from a corresponding one of the apical parts 81 of the yoke portion 71 of the stator core 70 and extends in the axial direction of the rotating shaft 5. Each of the protrusions 84 has a radially outer periphery press-fitted to the radially inner periphery of the thick-wall portion 46 of the housing 1, thereby fixing the stator core 70 to the housing 1. In addition, each of the protrusions 84 may further have a step portion that is formed at the rear end of the protrusion 84 to engage with a step portion of the housing 1 formed between the rear thin-wall portion 45 and the thick-wall portion 46.

Moreover, the protrusions 84 divide the second fuel passage 22 (i.e., the clearance between the radially outer periphery of the yoke portion 71 of the stator core 70 and the radially inner periphery of the thick-wall portion 46 of the housing 1) into a plurality of (e.g., six in the present embodiment) sections. As shown in FIG. 7, each of the sections of the second fuel passage 22 is formed between the radially outer periphery of a corresponding one of the central parts 82 of the yoke portion 71 and the radially inner periphery of the thick-wall portion 46 of the housing 1.

With the above configuration of the motor portion M according to the present embodiments the second fuel passage 22 can have a larger cross-sectional area than that in the second embodiment.

In addition, to further increase the cross-sectional area of the second fuel passage 22, it is also possible to omit three or less of the protrusions 84 of the stator core 70.

While the above particular embodiments of the invention have been shown and described, it will be understood by those skilled in the art that various modifications, changes, and improvements may be made without departing from the spirit of the invention.

For example, in the previous embodiments, the motor portion M of the electric fuel pump 100 is configured as an inner rotor-type brushless motor. However, the motor portion M may also be configured as an inner rotor-type brushed motor.

In the previous embodiments, the number of the slots 13 formed in the stator core of the stator is six, while the number of the magnetic pole portions formed in the magnet 7 of the rotor is four. That is, the number of the slots 13 is set to be greater than that of the magnetic pole portions. However, it is also possible to set the number of the slots 13 to be less than that of the magnetic pole portions. For example, the number of the magnetic pole portions may be increased to eight while the number of the slots 13 is kept at six.

In the previous embodiments, the pump portion P of the electric fuel pump 100 is configured as a turbo pump. However, the pump portion P may also be configured as a pump of another type, for example, a gear pump with inner and outer rotors.

In the previous embodiments, each of the tooth portions 12 or 72 of the stator core includes a pair of collar parts 67 and 68 or 87 and 88. However, it is also possible to omit the collar parts from each of the tooth portions.

In the first embodiment, there are formed the pair of ribs 64 on the radially outer periphery of the central part 63 of each of the yoke portions 11. However, it is also possible to omit the ribs 64 from each of the yoke portions 11.

In the first embodiment, there are provided, as shown in FIG. 4, the resin members 57 and 58 between the radially outer periphery of the stator core and the radially inner periphery of the housing 1; the circumferential width of the resin members 57 is greater than that of the resin members 58. However, it is also possible to provide only a plurality of resin members 58 each of which connects a circumferentially adjacent pair of the end parts 61 and 62 of the yoke portions 12 of the stator core pieces 9.

Similarly, in the second embodiment, there are provided, as shown in FIG. 6, the resin members 57 and 58 between the radially outer periphery of the stator core 70 and the radially inner periphery of the housing 1; the circumferential width of the resin members 57 is greater than that of the resin members 58. However, it is also possible to provide only a plurality of resin members 58 each of which covers the radially outer periphery of a corresponding one of the apical parts 81 of the polygonal tubular yoke portion 71.

Moreover, it is also possible to form, in each of the resin members 57 and 58, a through-hole that extends in the axial direction of the rotating shaft 5 to serve as a section of the second fuel passage 22.

In the previous embodiments, the rotating shaft 5 is supported by the pump casing 3 and end cover 4 respectively via the bearings 34 and 37. However, it is also possible to form, by resin molding, supporting portions in the stator of the motor portion M to support the rotating shaft 5 via respective bearings.

What is claimed is:

1. A fuel supply pump comprising:
a pump portion that pressurizes fuel sucked into a pump chamber and discharges the pressurized fuel; and
a motor portion including an inner rotor that drives the pump portion, an outer stator that is disposed so as to surround an outer periphery of the inner rotor in a circumferential direction, and a housing that is disposed to surround an outer periphery of the outer stator in the circumferential direction,
wherein
at one end of the housing, there is arranged the pump portion,
at the other end of the housing, there is arranged a synthetic resin-made end cover that has a discharge passage formed therein,
wherein
the outer stator includes a stator core, which is disposed with a gap formed between the stator core and the outer periphery of the inner rotor, and a stator coil wound on the stator core,
the gap is used as a first fuel supply passage for passing the fuel discharged from the pump portion,
the motor portion has, between the outer periphery of the outer stator and an inner periphery of the housing, a clearance that extends, at least, in an axial direction of a rotating shaft of the motor portion,
the clearance is used as a second fuel supply passage for passing the fuel discharged from the pump portion,
the end cover is integrally formed with a resin mold that covers the stator coil, and
the resin mold has a plurality of axial portions that join and are interposed between outermost surfaces of the outer stator and an inner surface of the housing and divide the second fuel supply passage into a plurality of sections, each of the plurality of sections being defined between circumferentially adjacent pairs of the axial portions of the resin mold, and where the second fuel supply passage sections do not extend outward in a radial direction beyond a cylindrical surface defined by outer surfaces of the axial portions, and
there is formed, around an end portion of the rotating shaft, a fuel converging portion on which all the fuel flowing out of the first and second fuel supply passages converge,
the first fuel supply passage directly communicates with the fuel converging portion,
the second fuel supply passage communicates with the fuel converging portion via a plurality of connection passages that are formed in the end cover,
the connection passages each radially extend to fluidically connect the second fuel supply passage to the fuel converging portion and are spaced from one another in the circumferential direction, and
the fuel converging portion also communicates with the discharge passage formed in the end cover so that the fuel discharged from the pump portion is led to the discharge passage through the first and second fuel supply passages, the connection passages and the converging portion.

2. The fuel supply pump as set forth in claim 1, wherein the stator core includes a polygonal tubular yoke that extends in the circumferential direction of the motor portion along the inner periphery of the housing, the polygonal tubular yoke has a plurality of apical parts, which are arranged in the circumferential direction of the motor portion at predetermined intervals, and a plurality of central parts each of which is formed between an adjacent pair of the apical parts, and each of the central parts includes a point that is positioned inward, in a radial direction of the motor portion, from the inner periphery of the housing by a depth of the second fuel supply passage.

3. The fuel supply pump as set forth in claim 1, wherein the stator core includes a plurality of yoke pieces that extend in the circumferential direction of the motor portion, each of the yoke pieces has a pair of circumferential end parts, which are respectively at opposite ends in the circumferential direction of the motor portion, and a circumferential central part that is formed between the circumferential end parts, and the circumferential central part includes a point that is positioned inward, in a radial direction of the motor portion, from the inner periphery of the housing by a depth of the second fuel supply passage.

4. The fuel supply pump as set forth in claim 3, wherein each of the yoke pieces is formed in one of a plurality of stator core pieces that are arranged in the circumferential direction of the motor portion along the inner periphery of the housing.

5. The fuel supply pump as set forth in claim 4, wherein the axial portions of the resin mold adhere to the circumferential end parts of adjacent pairs of the stator core pieces, thereby holding and fixing those adjacent pairs of the stator core pieces in such a manner as to connect them in the circumferential direction of the motor portion.

6. The fuel supply pump as set forth in claim 1, wherein the motor portion is a brushless motor in which the inner rotor is rotatably disposed inside of the outer stator.

7. The fuel supply pump as set forth in claim 1, wherein the pump portion is a turbo pump that includes an impeller driven by the motor portion, and the turbo pump pressurizes, with rotation of the impeller, the fuel that is sucked into the pump chamber via a suction inlet and discharges the pressurized fuel to an internal combustion engine side via a discharge outlet.

* * * * *